United States Patent
Huang

(10) Patent No.: US 9,464,677 B2
(45) Date of Patent: Oct. 11, 2016

(54) CENTER-PULL HYDRAULIC BRAKE CALIPER STRUCTURE FOR A BICYCLE

(71) Applicant: Yu-Ming Huang, Changhua (TW)

(72) Inventor: Yu-Ming Huang, Changhua (TW)

(73) Assignee: TEKTRO TECHNOLOGY CORP, Changhua (TW)

( * ) Notice: Subject to any disclaimer, the term of this patent is extended or adjusted under 35 U.S.C. 154(b) by 0 days.

(21) Appl. No.: 14/634,739

(22) Filed: Feb. 28, 2015

(65) Prior Publication Data

US 2016/0252146 A1 Sep. 1, 2016

(51) Int. Cl.
*F16D 55/18* (2006.01)
*F16D 55/224* (2006.01)
*F16D 55/00* (2006.01)

(52) U.S. Cl.
CPC ..... *F16D 55/224* (2013.01); *F16D 2055/0016* (2013.01)

(58) Field of Classification Search
CPC .... B60T 13/741; B60T 11/102; B60T 11/18; B60T 11/16; B62L 3/023; F16D 65/0068; F16D 65/58; F16D 55/225
USPC .............................. 188/72.4, 72.6, 24.22, 344
See application file for complete search history.

(56) References Cited

U.S. PATENT DOCUMENTS

| 2,189,904 | A | * | 2/1940 | Insko | B62L 3/023 188/152 |
|---|---|---|---|---|---|
| 3,718,373 | A | * | 2/1973 | Hofer | B60T 8/18 303/7 |
| 4,032,200 | A | * | 6/1977 | Farr | B60T 8/3225 188/344 |
| 4,257,496 | A | * | 3/1981 | Fujita | F16D 55/224 188/344 |
| 5,632,362 | A | * | 5/1997 | Leitner | B62L 1/00 188/18 A |
| 2007/0296266 | A1 | * | 12/2007 | Costa | B62K 19/38 303/9.62 |
| 2014/0038757 | A1 | * | 2/2014 | Kariyama | B60T 17/043 474/101 |
| 2014/0158487 | A1 | * | 6/2014 | Moore | B62L 3/023 188/344 |
| 2014/0231203 | A1 | * | 8/2014 | Chen | B62L 3/023 188/344 |

* cited by examiner

*Primary Examiner* — Robert A Siconolfi
*Assistant Examiner* — Mahbubur Rashid
(74) *Attorney, Agent, or Firm* — Yuwen Guo

(57) ABSTRACT

A center-pull hydraulic brake caliper structure for a bicycle is disclosed. The movable tube is rotated by the outer convex ring and then one end of the movable tube distant from the outer convex ring is distant from or against the first flange to adjust the position of the flowing openings and to make the pressure of oil and air not influence the use of brake.

4 Claims, 5 Drawing Sheets

CENTER-PULL HYDRAULIC BRAKE CALIPER STRUCTURE FOR A BICYCLE

FIELD OF THE INVENTION

The present invention relates to a bicycle, and more particularly to a center-pull hydraulic brake caliper structure for a bicycle.

BACKGROUND OF THE INVENTION

The hydraulic brake system used for a bicycle may be seemed to one of the most popular hydraulic devices. It is mainly that a brake master cylinder driven by a handle is arranged at the handlebar and then connected to a brake caliper through a hydraulic line. When the handlebar is pressed by a rider, the piston inside the master cylinder is driven to move forwardly by the handle, and then the oil inside the master cylinder is pushed to the slave cylinder of the caliper. Then, the brake pads are moving toward the brake disc and further the wheel starts to be braked.

However, the brake master cylinder must be arranged adjacent to the handlebar and hard to be adjusted. And it is inconvenient that the two holes with 0.5 mm diameter may not be adjusted after finishing assembly.

SUMMARY OF THE INVENTION

Therefore, a center-pull hydraulic brake caliper structure for a bicycle is provided. The movable tube is rotated by the outer convex ring and then one end of the movable tube distant from the outer convex ring is distant from or against the first flange to adjust the position of the flowing openings and to make the pressure of oil and air not influence the use of brake.

When moving the first piston to tension the brake cable to adjust the oil pressure, the oil is pushed into the brake caliper by the first piston for braking. Or, when releasing the brake cable, the first piston is returned to original position with the elasticity of the elastic member and the oil is flowed back to body and then the brake caliper is released. Besides, the position of the first piston may be adjusted by rotating the movable tune based on user's demand.

The brake cable is passed through the first end plug, the second piston, the first piston, and then fastened by the two elastic sheets to form a center-pull structure.

A center-pull hydraulic brake caliper structure for a bicycle may comprise a body, having a first cylinder and a second cylinder fluidly connected with each other, a first female thread portion and a second female thread portion are respectively arranged at two ends of the first cylinder, a third female thread portion is arranged at one end of the second cylinder adjacent to the first female thread portion, the third female thread portion is screwed with a third male thread portion of an end cap, the first cylinder has a first flange and a second flange, the first flange is arranged adjacent to the first female thread portion, the second flange is arranged adjacent to the second female portion; a movable tube, passing through the first cylinder of the body, an outer convex ring is protruded radially and outwardly from one end of the movable tube, the outer convex ring is exposed outside the first cylinder, a first male thread portion is arranged at an outer surface adjacent to the outer convex ring, a fourth female thread portion is arranged at an inner surface adjacent to the outer convex ring, the first male thread portion is rotatably and adjustably screwed with the first female thread portion, the female fourth thread portion is screwed with a fourth male thread portion of a first end plug, and the movable tube has two flowing opening spaced apart from each other and arranged between two ends of the movable tube; a first piston, having a large diameter section and a small diameter section connected with each other, the large diameter section is passed through the movable tube, the small diameter section is exposed outside the movable tube, the connection of the large diameter section and the small diameter is against the first end plug, a fifth male thread portion is arranged at one end of the small diameter section distant from the large diameter section, the inner surface of the small diameter section which has the fifth male thread portion is an inner outward tapered portion, a fifth female thread portion of an outer sleeve is screwed with the fifth male thread portion, a third flange is arranged inside one end of the outer sleeve distant from the fifth female thread portion, a fourth flange is arranged outside one end of the outer sleeve adjacent to the fifth female thread portion, two elastic sheets of an inner connection member are plugged in the inner outward tapered portion, an outer protruding ring between two ends of the inner connection member is against a location of the third flange adjacent to the fifth female thread portion, and the two elastic sheets are pressed to fasten one end of a brake cable; a second piston, one end thereof is plugged in one end of the large diameter section of the first piston distant from the small diameter section, and the other end thereof is plugged in the first cylinder, against the second flange, and adjacent to the second female thread portion, a second male thread portion of a second end plug is rotatably and adjustably screwed with the second female thread portion of the first cylinder and against one end of the second piston adjacent to the second female thread portion; and a brake caliper, fluidly connected with the body.

Wherein the brake cable is passed through the first end plug, the second piston, the first piston, and then fastened by the two elastic sheets.

Wherein the second piston, the small diameter section of the first piston, or both are passed through an elastic member.

In some embodiments, the second piston is passed through the elastic member, and the large diameter section of the first piston and the first flange of the first cylinder are respectively against two ends of the elastic member.

In some embodiments, the small diameter section of the first piston is passed through the elastic member, and the fourth flange and one end of the first cylinder adjacent to the first female thread portion are respectively against two ends of the elastic member.

In some embodiments, the second piston and the small diameter section of the first piston both are respectively passed through the elastic members, the large diameter section of the first piston and the first flange of the first cylinder are respectively against two ends of one of the elastic member, and the fourth flange and one end of the first cylinder adjacent to the first female thread portion are respectively against two ends of the other elastic member.

In some embodiments, two concave ring grooves are respectively arranged at two ends of the large diameter section of the first piston, and each concave ring groove is sleeved a V-ring.

In some embodiments, two concave ring grooves are respectively arranged at a location of the movable tube adjacent to the first male thread portion and a location of the movable tube distant from the first male thread portion, and each concave ring grove is sleeved an O-ring.

In some embodiments, a sealing member is arranged between the third female thread portion and the third male thread portion.

DESCRIPTION OF THE PREFERRED EMBODIMENT

Figure 1:
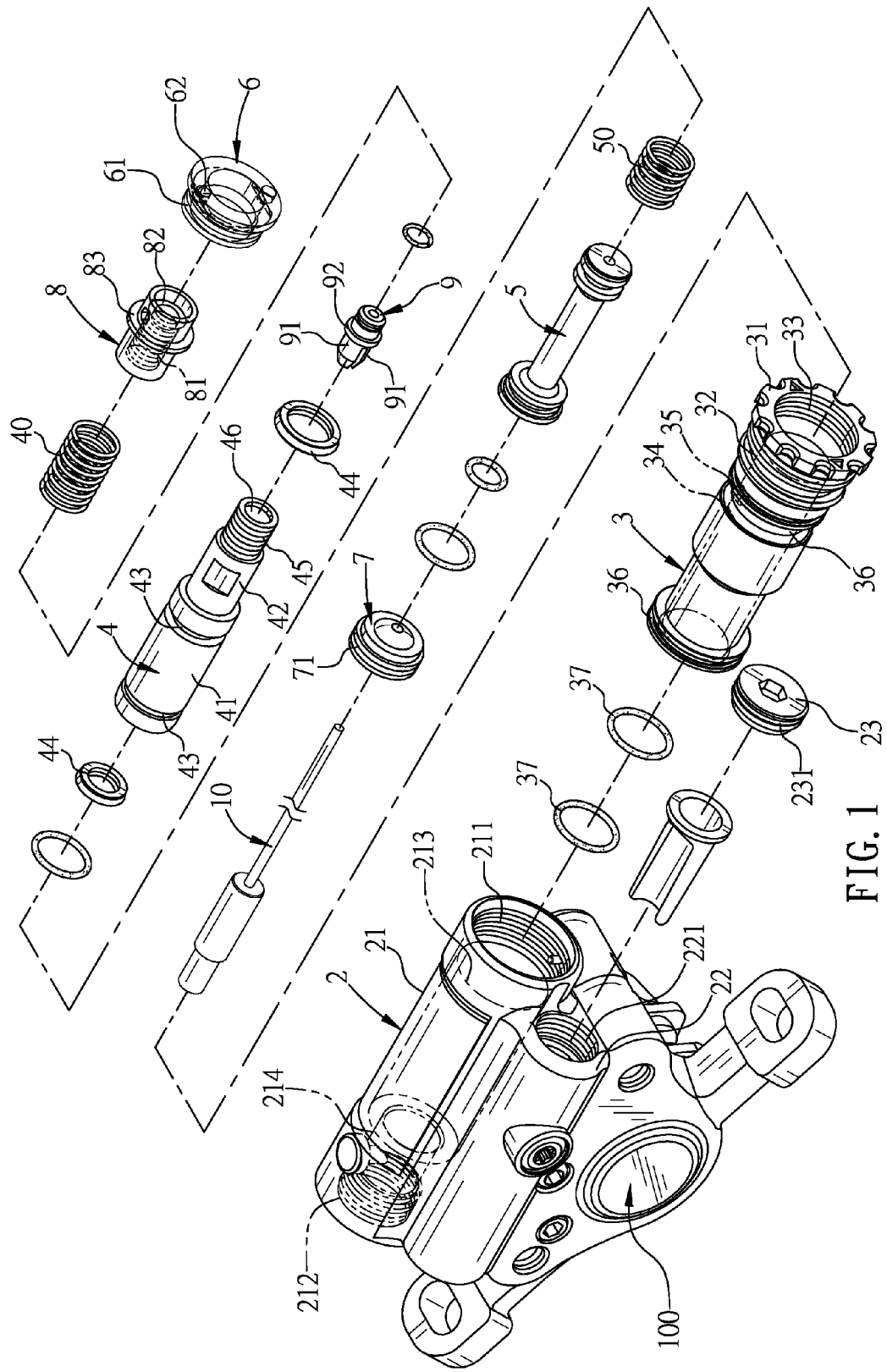
FIG. 1 is an exploded view of a first embodiment of a center-pull hydraulic brake caliper structure for a bicycle according to present invention.
Figure 2:
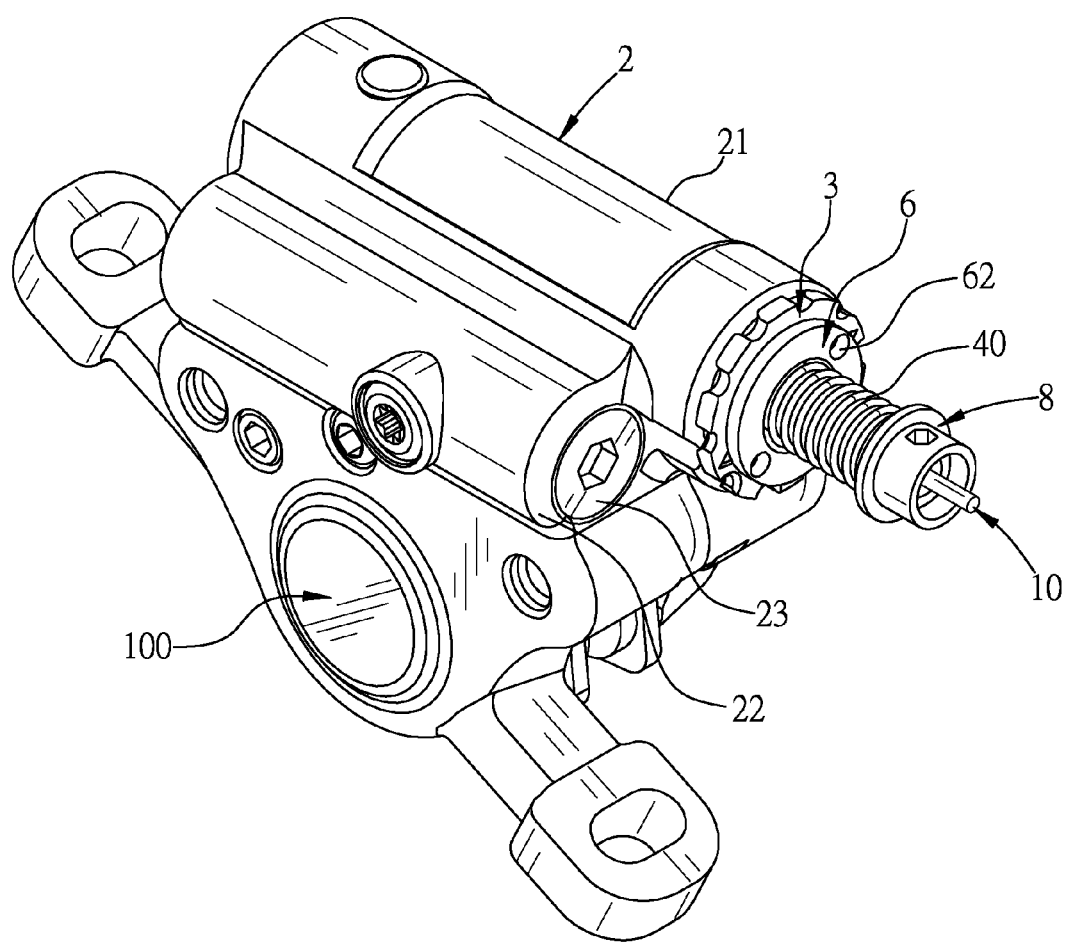
FIG. 2 is an outside view of the first embodiment of a center-pull hydraulic brake caliper structure for a bicycle according to present invention.
Figure 3:
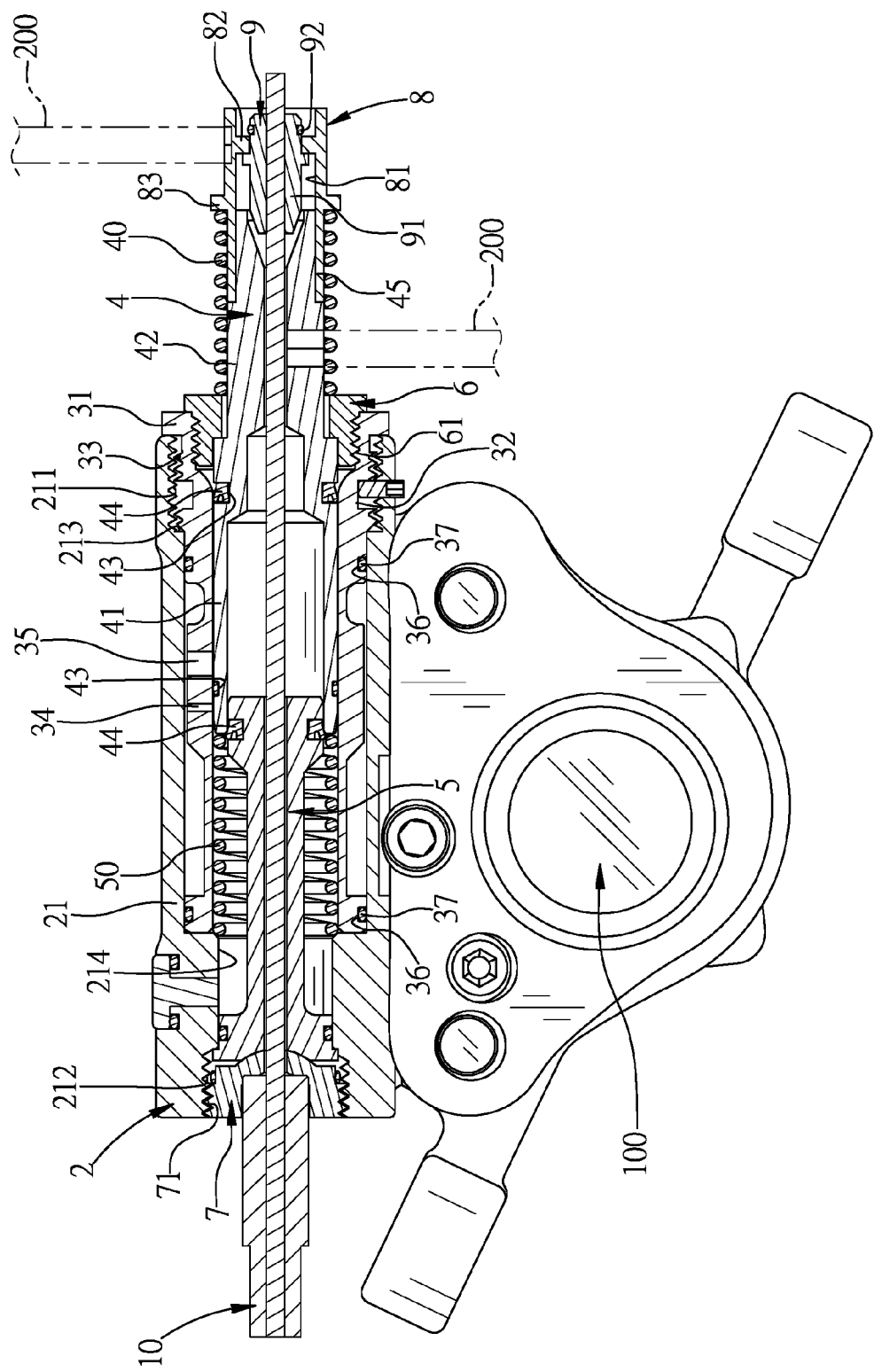
FIG. 3 is a cross-sectional view of the first embodiment of a center-pull hydraulic brake caliper structure for a bicycle according to present invention.

Please refer to FIGS. 1 to 5, the center-pull hydraulic brake caliper structure 1 for a bicycle (not shown) may comprise a body 2, a movable tube 3, a first piston 4, and a second piston 5.

The body 2 may have a first cylinder 21 and a second cylinder 22 fluidly connected with each other. A first female thread portion 211 and a second female thread portion 212 are respectively arranged at two ends of the first cylinder 1. A third female thread portion 221 is arranged at one end of the second cylinder 22 adjacent to the first female thread portion 211. The third female thread portion 221 is screwed with a third male thread portion 231 of an end cap 23, and a sealing member (not shown) may be arranged between the third female thread portion 221 and the third male thread portion 231. The first cylinder 21 may have a first flange 213 and a second flange 214. The first flange 213 is arranged adjacent to the first female thread portion 211 and the second flange 214 is arranged adjacent to the second female portion 212.

In addition, the body 2 may be fluidly connected with a brake caliper 100.

The movable tube 3 may be passing through the first cylinder 21 of the body 2. An outer convex ring 31 is protruded radially and outwardly from one end of the movable tube 3. The outer convex ring 31 is exposed outside the first cylinder 21. A first male thread portion 32 is arranged at an outer surface adjacent to the outer convex ring 31. A fourth female thread portion 33 is arranged at an inner surface adjacent to the outer convex ring 31. The first male thread portion 32 is rotatably and adjustably screwed with the first female thread portion 211. The distance for being adjusted is 1 mm. The fourth female thread portion 33 is screwed with a fourth male thread portion 61 of a first end plug 6. And the movable tube 3 has two flowing opening 34 and 35 (such as opening with 0.5 mm diameter) spaced apart from each other and arranged between two ends of the movable tube 3. The first end plug 6 has a positioning hole 62 for aligning with the openings 34 and 35.

Furthermore, two concave ring grooves 36 are respectively arranged at a location of the movable tube 3 adjacent to the first male thread portion 32 and a location of the movable tube 3 distant from the first male thread portion 32. And each concave ring grove 36 is sleeved an O-ring 37.

The first piston 4 may have a large diameter section 41 and a small diameter section 42 connected with each other. The large diameter section 41 is passed through the movable tube 3 and the small diameter section 42 is exposed outside the movable tube 3. The connection of the large diameter section 41 and the small diameter 42 is against the first end plug 6.

In addition, two concave ring grooves 43 are respectively arranged at two ends of the large diameter section 41 of the first piston 4 and each concave ring groove 43 is sleeved a V-ring 44.

One end of the second piston 5 is plugged in one end of the large diameter section 41 of the first piston 4 distant from the small diameter section 42, and the other end thereof is plugged in the first cylinder 21, against the second flange 214, and adjacent to the second female thread portion 212. A second male thread portion 71 of a second end plug 7 is rotatably and adjustably screwed with the second female thread portion 212 of the first cylinder 21 and against one end of the second piston 5 adjacent to the second female thread portion 212.

Therefore, the movable tube 3 is rotated by the outer convex ring 31 and then one end of the movable tube 3 distant from the outer convex ring 31 is distant from or against the first flange 213 to adjust the position of the flowing openings 34 and 35 and to make the pressure of oil and air not influence the use of brake.

Besides, a fifth male thread portion 45 is arranged at one end of the small diameter section 42 distant from the large diameter section 41. The inner surface of the small diameter section 42 which has the fifth male thread portion 45 is an inner outward tapered portion 46. A fifth female thread portion 81 of an outer sleeve 8 is screwed with the fifth male thread portion 45. A third flange 82 is arranged inside one end of the outer sleeve 8 distant from the fifth female thread portion 81 and a fourth flange 83 is arranged outside one end of the outer sleeve 8 adjacent to the fifth female thread portion 81. Two elastic sheets 91 of an inner connection member 9 are plugged in the inner outward tapered portion 46. An outer protruding ring 92 between two ends of the inner connection member 9 is against a location of the third flange 82 adjacent to the fifth female thread portion 81 and the two elastic sheets 91 are pressed to fasten one end of a brake cable 10. The brake cable 10 is passed through the first end plug 6, the second piston 5, the first piston 4, and then fastened by the two elastic sheets 91 to form a center-pull structure.

Figure 4:
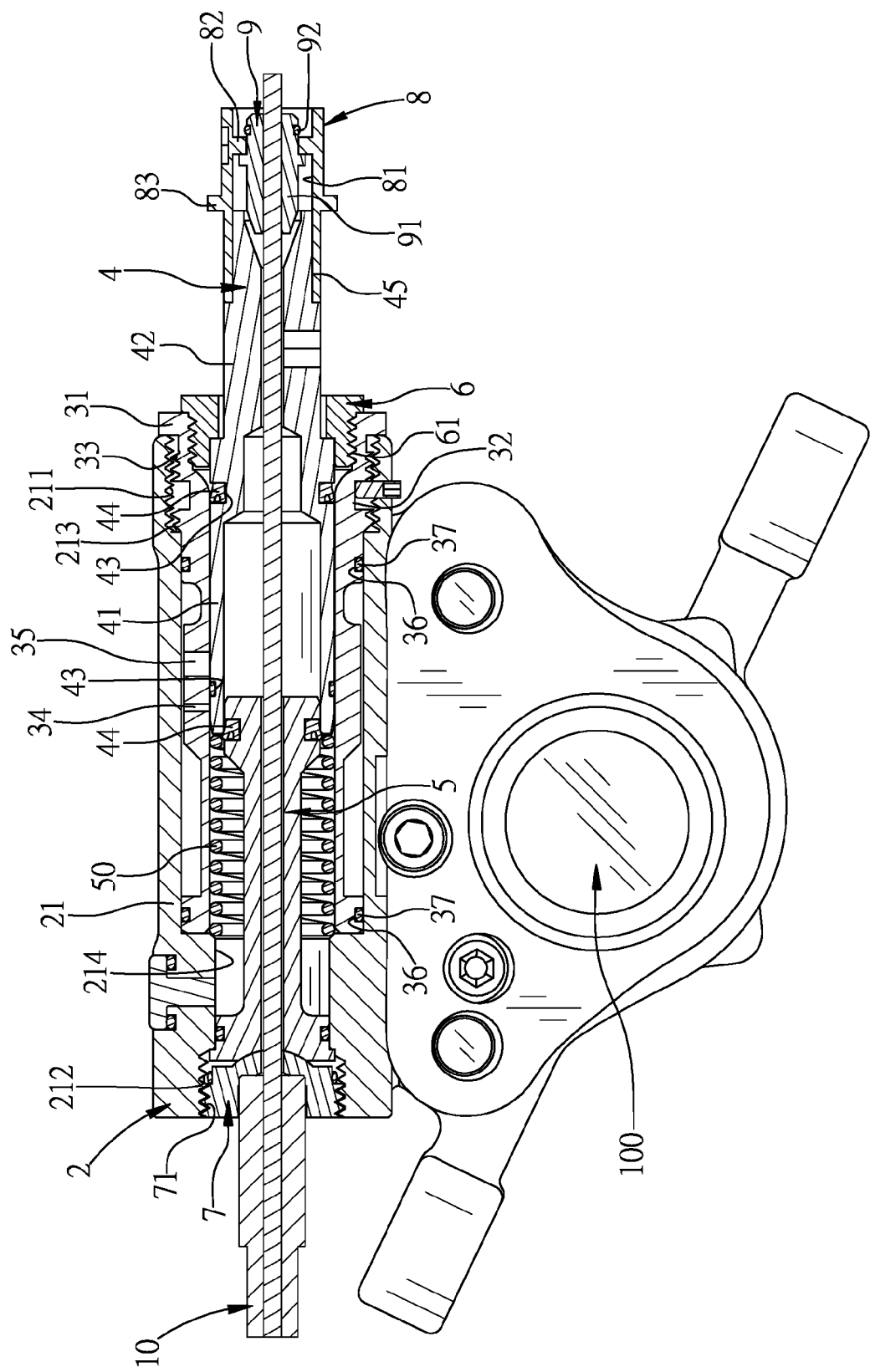
FIG. 4 is an exploded view of a second embodiment of the center-pull hydraulic brake caliper structure for the bicycle according to present invention.

In one embodiment, the second piston 5 is passed through the elastic member 50 and the large diameter section 41 of the first piston 4 and the first flange 212 of the first cylinder 21 are respectively against two ends of the elastic member 50 (shown as in FIG. 4).

Figure 5:
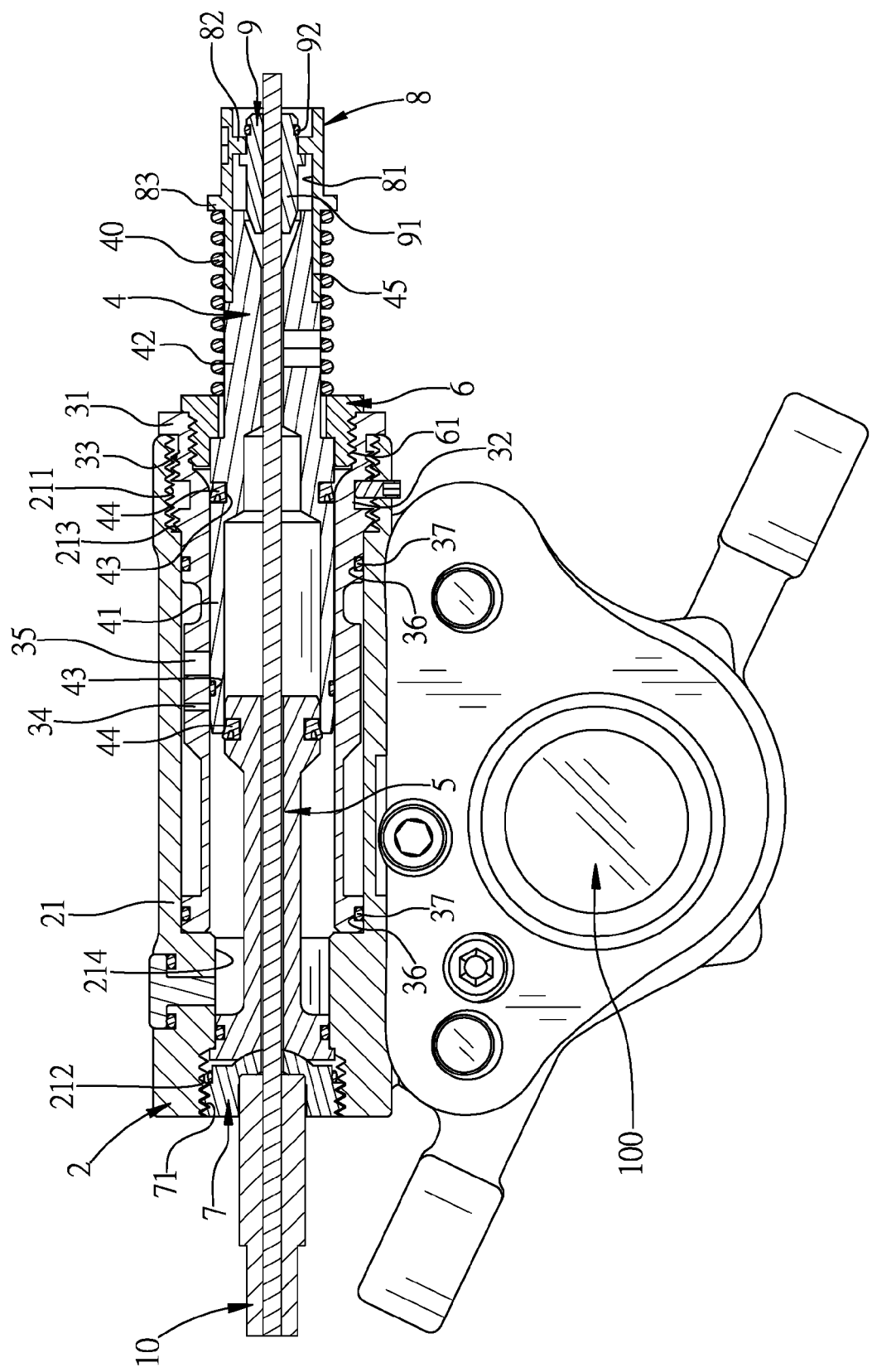
FIG. 5 is a cross-sectional view of a third embodiment of the center-pull hydraulic brake caliper structure for the bicycle according to present invention.

In other embodiment, the small diameter section 42 of the first piston 4 is passed through the elastic member 40 and the fourth flange 83 and one end of the first cylinder 21 adjacent to the first female thread portion 211 are respectively against two ends of the elastic member 40 (shown as in FIG. 5).

In another embodiment, the second piston 5 and the small diameter section 42 of the first piston 4 both are respectively passed through the elastic members 50 and 40. The large diameter section 41 of the first piston 4 and the first flange 213 of the first cylinder 21 are respectively against two ends of one of the elastic member 50. And the fourth flange 83 and one end of the first cylinder 21 adjacent to the first female thread portion 211 are respectively against two ends of the other elastic member 40 (shown as in FIG. 3).

When moving the first piston 4 to tension the brake cable 10 to adjust the oil pressure, the oil is pushed into the brake caliper 100 by the first piston 4 for braking. Or, when releasing the brake cable 10, the first piston 4 is returned to original position with the elasticity of the elastic member 40 and/or 50 and the oil is flowed back to body 2 and then the brake caliper 100 is released.

Besides, the position of the first piston 4 may be adjusted by rotating the movable tune 3 based on user's demand.

Furthermore, the brake cable 10, the first cylinder 21, the first piston 4, and the second piston 5 are co-axially arranged.

What is claimed is:

1. A center-pull hydraulic brake caliper structure for a bicycle, at least comprising:
    a body, having a first cylinder and a second cylinder fluidly connected with each other, a first female thread portion and a second female thread portion are respectively arranged at two ends of the first cylinder, a third female thread portion is arranged at one end of the second cylinder adjacent to the first female thread portion, the third female thread portion is screwed with a third male thread portion of an end cap, the first cylinder has a first flange and a second flange, the first flange is arranged adjacent to the first female thread portion, the second flange is arranged adjacent to the second female portion;
    a movable tube, passing through the first cylinder of the body, an outer convex ring is protruded radially and outwardly from one end of the movable tube, the outer convex ring is exposed outside the first cylinder, a first male thread portion is arranged at an outer surface adjacent to the outer convex ring, a fourth female thread portion is arranged at an inner surface adjacent to the outer convex ring, the first male thread portion is rotatably and adjustably screwed with the first female thread portion, the female fourth thread portion is screwed with a fourth male thread portion of a first end plug, and the movable tube has two flowing openings spaced apart from each other and arranged between two ends of the movable tube, the movable tube is rotated by the outer convex ring and then one end of the movable tube distant from the outer convex ring is distant from or against the first flange to adjust the position of the two flowing openings;
    a first piston, having a large diameter section and a small diameter section connected with each other, the large diameter section is passed through the movable tube, the small diameter section is exposed outside the movable tube, the connection of the large diameter section and the small diameter section is against the first end plug, a fifth male thread portion is arranged at one end of the small diameter section distant from the large diameter section, the inner surface of the small diameter section which has the fifth male thread portion is an inner outward tapered portion, a fifth female thread portion of an outer sleeve is screwed with the fifth male thread portion, a third flange is arranged inside one end of the outer sleeve distant from the fifth female thread portion, a fourth flange is arranged outside one end of the outer sleeve adjacent to the fifth female thread portion, two elastic sheets of an inner connection member are plugged in the inner outward tapered portion, an outer protruding ring between two ends of the inner connection member is against a location of the third flange adjacent to the fifth female thread portion, and the two elastic sheets are pressed to fasten one end of a brake cable;
    a second piston, one end thereof is plugged in one end of the large diameter section of the first piston distant from the small diameter section, and the other end thereof is plugged in the first cylinder, against the second flange, and adjacent to the second female thread portion, a second male thread portion of a second end plug is rotatably and adjustably screwed with the second female thread portion of the first cylinder and against one end of the second piston adjacent to the second female thread portion; and
    a brake caliper, fluidly connected with the body;
    wherein the brake cable is passed through the first end plug, the second piston, the first piston, and then fastened by the two elastic sheets; and
    wherein the second piston is passed through an elastic member, and the large diameter section of the first piston and the first flange of the first cylinder are respectively against two ends of the elastic member; or the small diameter section of the first piston is passed through an elastic member, and the fourth flange and one end of the first cylinder adjacent to the first female thread portion are respectively against two ends of the elastic member; or the second piston and the small diameter section of the first piston both are respectively passed through two elastic members, the large diameter section of the first piston and the first flange of the first cylinder are respectively against two ends of one of the elastic member, and the fourth flange and one end of the first cylinder adjacent to the first female thread portion are respectively against two ends of the other elastic member.

2. The structure as claimed in claim 1, wherein two concave ring grooves are respectively arranged at two ends of the large diameter section of the first piston, and each concave ring groove is sleeved a V-ring.

3. The structure as claimed in claim 1, wherein two concave ring grooves are respectively arranged at a location of the movable tube adjacent to the first male thread portion and a location of the movable tube distant from the first male thread portion, and each concave ring grove is sleeved an O-ring.

4. The structure as claimed in claim 1, wherein a sealing member is arranged between the third female thread portion and the third male thread portion.

* * * * *